United States Patent
Kanjariya et al.

(10) Patent No.: US 10,089,070 B1
(45) Date of Patent: Oct. 2, 2018

(54) VOICE ACTIVATED NETWORK INTERFACE

(71) Applicant: CISCO TECHNOLOGY, INC., San Jose, CA (US)

(72) Inventors: Mitesh Mukesh Kanjariya, San Jose, CA (US); Mouli Vytla, San Jose, CA (US); Rahul BrajeshKumar Jain, San Jose, CA (US); Aditi Srivastava, Sunnyvale, CA (US); Tejas Nagarmat, Milpitas, CA (US); Hemanth Basappa Mallikarjunaswamy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 15/099,437

(22) Filed: Apr. 14, 2016

Related U.S. Application Data

(60) Provisional application No. 62/216,158, filed on Sep. 9, 2015.

(51) Int. Cl.
| | | |
|---|---|---|
| *G10L 15/00* | (2013.01) | |
| *G06F 3/16* | (2006.01) | |
| *G10L 15/26* | (2006.01) | |
| *G06F 17/27* | (2006.01) | |
| *G06F 17/22* | (2006.01) | |
| *G10L 15/22* | (2006.01) | |

(52) U.S. Cl.
CPC .......... *G06F 3/167* (2013.01); *G06F 17/2264* (2013.01); *G06F 17/2705* (2013.01); *G10L 15/265* (2013.01); *G10L 2015/223* (2013.01); *G10L 2015/225* (2013.01)

(58) Field of Classification Search
CPC ... G10L 15/00; G10L 15/265; G10L 2015/00; B60R 16/0373; G06F 3/16; G01C 21/3608; H04M 1/21; H04M 3/49336; A63F 13/00; A61B 17/00
USPC ..................... 704/270, 270.1, 275
See application file for complete search history.

(56) References Cited

U.S. PATENT DOCUMENTS

| | | | | |
|---|---|---|---|---|
| 5,873,064 A | * | 2/1999 | De Armas | G06F 3/16 704/275 |
| 6,263,375 B1 | * | 7/2001 | Ortega | G06F 17/2229 704/270 |
| 6,397,186 B1 | * | 5/2002 | Bush | G10L 15/26 704/272 |
| 6,404,879 B1 | | 6/2002 | Smith et al. | |
| 6,690,392 B1 | * | 2/2004 | Wugoski | G06F 3/0481 715/704 |
| 6,816,837 B1 | * | 11/2004 | Davis | G10L 15/26 704/275 |
| 7,881,941 B2 | | 2/2011 | Kurganov et al. | |

(Continued)

*Primary Examiner* — Paras D Shah

(57) ABSTRACT

In an example, there is disclosed a method of providing voice-activated network control (VANC), including: receiving a voice input; converting the voice input to a computer-usable form; parsing the voice input into key tokens; building a network policy macro from the key tokens; and causing commands based on the network policy macro to be executed on a target device. There is also disclosed one or more apparatuses for performing the method, and one or more computer-readable mediums having stored thereon executable instructions for realizing the method on a device.

20 Claims, 9 Drawing Sheets

(56) References Cited

U.S. PATENT DOCUMENTS

| | | | |
|---|---|---|---|
| 2001/0041982 A1* | 11/2001 | Kawasaki | G10L 15/26 704/275 |
| 2002/0007278 A1 | 1/2002 | Traynor | |
| 2007/0005370 A1 | 1/2007 | Elshout | |
| 2007/0124149 A1* | 5/2007 | Shen | G10L 15/26 704/275 |
| 2007/0276672 A1* | 11/2007 | Koyama | B60R 16/0373 704/275 |
| 2008/0046251 A1* | 2/2008 | Agapi | G10L 15/265 704/275 |
| 2008/0248797 A1* | 10/2008 | Freeman | H04M 1/72522 455/425 |
| 2008/0288259 A1* | 11/2008 | Chambers | G10L 15/22 704/275 |
| 2009/0083034 A1* | 3/2009 | Hernandez | G10L 15/1822 704/251 |
| 2009/0177477 A1* | 7/2009 | Nenov | A61B 5/0002 704/275 |
| 2010/0312547 A1* | 12/2010 | Van Os | G06F 3/167 704/9 |
| 2011/0223893 A1* | 9/2011 | Lau | G10L 15/22 455/414.1 |
| 2012/0030712 A1 | 2/2012 | Chang | |
| 2012/0078635 A1* | 3/2012 | Rothkopf | G10L 15/30 704/270.1 |
| 2012/0146918 A1* | 6/2012 | Kreiner | H04M 1/7253 345/173 |
| 2012/0253824 A1* | 10/2012 | Alcantara Talavera | H04M 11/007 704/275 |
| 2013/0183944 A1* | 7/2013 | Mozer | H04L 12/282 455/414.1 |
| 2013/0332168 A1* | 12/2013 | Kim | G10L 15/22 704/251 |
| 2014/0169795 A1* | 6/2014 | Clough | G06F 19/3418 398/106 |
| 2014/0267933 A1* | 9/2014 | Young | H04N 21/42203 348/734 |
| 2015/0254058 A1* | 9/2015 | Klein | G06F 3/167 704/275 |
| 2015/0256873 A1* | 9/2015 | Klein | H04N 21/26283 725/39 |
| 2015/0324706 A1* | 11/2015 | Warren | H04L 12/2803 700/275 |
| 2017/0052760 A1* | 2/2017 | Johnson | G06F 3/167 |

* cited by examiner

VOICE ACTIVATED NETWORK INTERFACE

CROSS REFERENCE TO RELATED APPLICATIONS

This Application claims priority to U.S. Provisional Application 62/216,158, titled "VOICE-ACTIVATED NETWORK INTERFACE," filed Sep. 9, 2015, which is incorporated herein by reference.

FIELD OF THE SPECIFICATION

This disclosure relates in general to the field of enterprise network management, and more particularly, though not exclusively to, a system and method for voice activated network control (VANC).

BACKGROUND

Voice recognition, also known as (STT), is a computer processing subsystem in which a person speaks into a transducer, such as a microphone in a natural tone of voice. The transducer captures and digitizes the speech, and a speech-to-text engine parses the speech into words or phrases, which are then conditioned and compared to baseline models to create computer-readable text. Thus, in a theoretically ideal STT engine, a user could read the text of this section of the specification into a microphone, and the STT would reproduce the corresponding ASCII text verbatim.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1A:
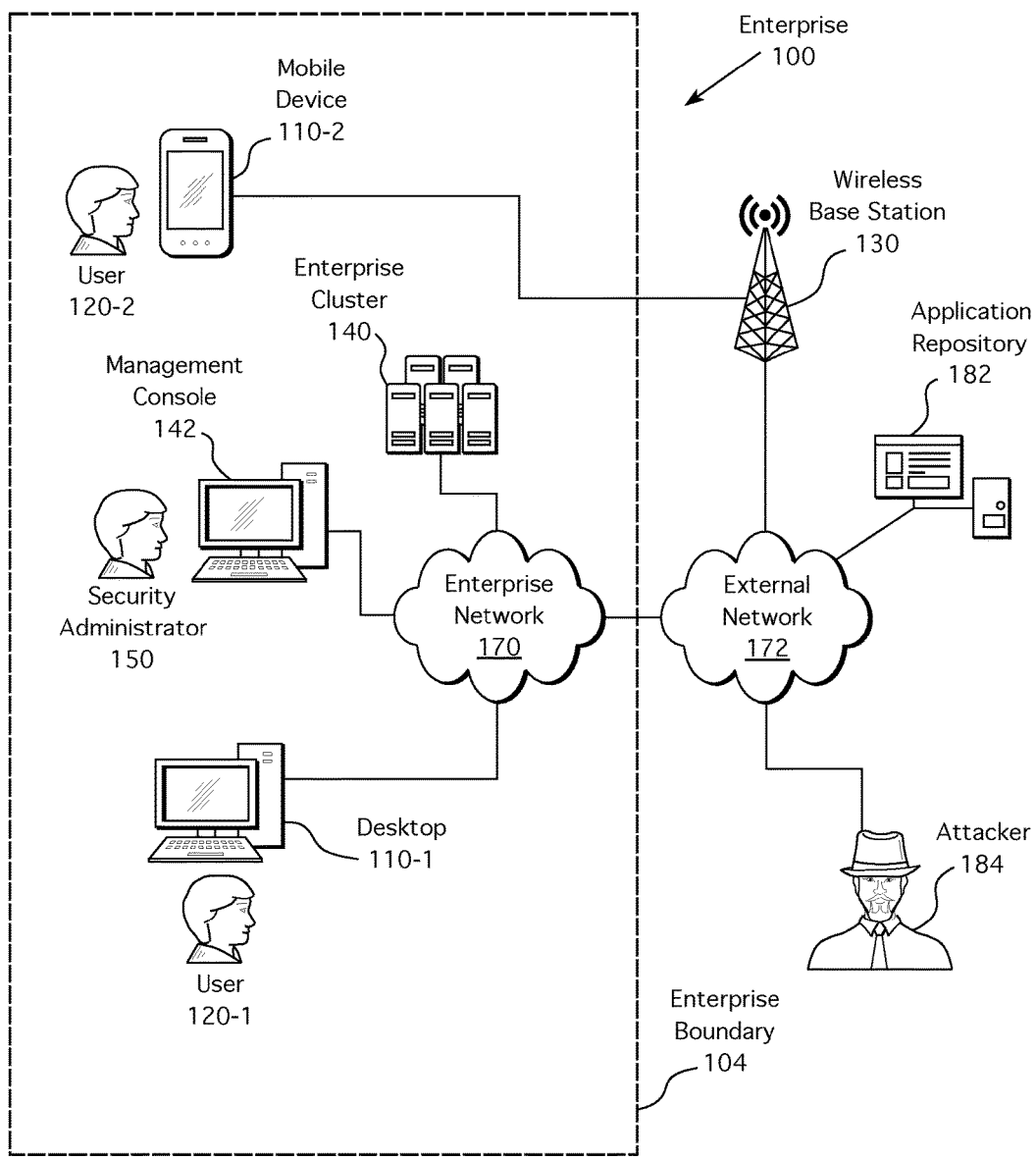
FIGS. 1A and 1B are block diagram of a network architecture according to one or more examples of the present specification.

In an example, there is disclosed a method of providing voice-activated network control (VANC), including: receiving a voice input; converting the voice input to a computer-usable form; parsing the voice input into key tokens; building a network policy macro from the key tokens; and causing commands based on the network policy macro to be executed on a target device. There is also disclosed one or more apparatuses for performing the method, and one or more computer-readable mediums having stored thereon executable instructions for realizing the method on a device.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Furthermore, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Network configuration is the process of setting up, configuring, and managing a network, and is especially important in enterprise networks, where configuration is an ongoing and non-trivial task. There are many tools available to a network administrator to assist in managing a network. Traditionally, a command-line, textual, or graphical interface or other network management software may be used to simplify administration tasks, including configuring, provisioning, administering, and monitoring network equipment. Because of the complexity of certain network tasks, it is often more convenient to provide network management software on a full administration console with a traditional keyboard and mouse. Although there are available solutions for providing some network management functionality via more portable devices, such as netbooks, tablets, and smart phones, the limited input-output (I/O) capabilities of these devices provide a natural barrier to performing more complicated network operations.

These limitations can prove to be a barrier to network administrators in certain contexts. For example, in an increasingly interconnected and mobile world, it may be important for network administrators to have access to key network management functions even while they're away from their desks or operating in nontraditional contexts. This is especially important with the increase of flexible work arrangements, where some administrators may work from home or off-site, and may more fully integrate their personal lives with their work lives than was traditionally done in the past. Thus, an off-site network administrator waiting to pick up his children from school may need equal or nearly equal access to network management functions as a network administrator sitting in her office operating a locally-connected PC.

The increasing capabilities of computers, smartphones, tablets, and other personal computing devices have also increased the expectation that persons with disabilities will be reasonably accommodated. But if network functions are accessible only via traditional command line interfaces (CLIs) and graphical user interfaces (GUIs), then disabled network administrators may have mechanical difficulty in performing network management tasks that they are otherwise well suited to.

Thus, it is advantageous to provide network administration capabilities via voice-activated network control (VANC). And because modern mobile devices have computing power equivalent to those of desktop or server devices from only a few years ago, many are powerful enough to provide a fully featured speech-to-text (STT) engine. Devices that do not have an on-board STT engine may nevertheless have access to a cloud-based STT service. Thus, STT can be configured to convert voice commands to text, and a VANC client engine can be configured to condition that text into special-purpose VANC commands or command strings (macros) that can be used to cause a network device, such as an appropriately-configured network switch, to send configuration commands to servers and other network hosts.

Advantageously, VANC services enable numerous functions. For example, voice commands may be used to:
 a. Configure and provision network equipment.
 b. Monitor network equipment.
 c. Configure and receive statuses and alerts from network equipment.
 d. Enable visually or mechanically impaired administrators to more easily configure and monitor networks.
 e. Ease compliance with rules and regulations, such as the Federal Communications Commission (FCC) Twenty-First Century Communications and Video Accessibility Act of 2010 ("CVAA").
 f. Provide enhanced access to advanced communication services ("ACS") for disabled personnel.
 g. Configure, provision, monitor, and administer network equipment from anywhere in the world where the network administrator has network access, and from virtually any computing device with a user interface.

A fully-configured VANC distribution may include both a VANC client module, and a VANC server module.

The VANC client module may include a user interface (UI) that can run on a desktop computer, tablet, smart phone, or other device. This module may accept voice commands from the user, perform STT on the input, tokenizer or otherwise parse the input, and translate the input into a network policy macro. As used throughout this specification, a "network policy macro" should be understood to understand any command, command string, command sequence, macro, function, subroutine, object, procedure call, or other self-contained functional or procedural unit that maps to one or more VANC commands. It is expressly intended that network policy macros include only macros that are specially configured or configurable for use with a VANC architecture as disclosed herein. Thus, a network policy macro should be understood to exclude existing, general-purpose macros that already exist or are already defined on a system, even if those macros can be mapped to particular voice commands.

Once the VANC client module has reduced the spoken command to a network policy macro, it may export the network policy macro to the VANC server, for example via a network interface.

On the "backend," a VANC server may run on an appropriate network device, such as a virtual machine, server, or smart network switch (for example, Cisco® N7000 switches have intelligence suitable for hosting a VANC server). The VANC server may perform any additional conditioning or mapping necessary on a network policy macro, and may then issue the actual commands to network devices. A provisioning server may provide status updates and feedback on the result of each action. Once the results are received, the VANC server may provide feedback or a report to the VANC client module. The VANC client module may display the feedback appropriate, such as on a screen, via haptic feedback, via text-to-speech (US), or any combination of outputs. This may include providing a running "dashboard" on the VANC client UI, which can report statuses visually. The VANC server may also be configured to announce status and monitoring alerts to the user.

A VANC provisioning server may also be configured to host:
 a. A repository of device profiles (e.g., a profile for each device or type of present in the enterprise network).
 b. A repository of tenant profiles, representing different VM "tenants" on the network, and policies for configuring each.
 c. A repository of configuration templates, which may be used for configuring the network for different customers with different topologies.
 d. A rules engine to correlate user inputs to the tenant profile, configuration template, and device profile. Data may be collected, for example, from device profiles, to determine how to communicate with a network device (e.g., tcl, REST, Cisco® APIC, or NetConf). The rules engine may be used to generate the required configuration to send to a network device.
 e. An alert and monitoring module to receive alerts from network devices. The alerts can be configured based on any appropriate trigger, such as syslog messages, SNMP traps, EMM alerts, or network events. Alerts and monitoring reports may also be configured to be provided on any periodic schedule (e.g., "daily at 6 pm") or for one-off scheduled events (e.g., "today at 6 pm").
 f. Polling for status of a requested operation, and reporting completion status to VANC client.
 g. An engine for receiving updates and alerts from network devices.
 h. Relays for sending alerts to mobile users (for example, e-mail, text, instant messaging).

Note that in some cases, a network policy macro may map directly to a command string for a specific device, or it may be a more generic macro that maps to a more specific network policy macro at the server side. For example, different services may be configurable with similar commands, but implementation details may be different for each, as each relies on different communication protocols. Thus, the first-level network policy macro may map to a higher-level language or script. A JavaScript Object Notation (".json") file on the client side is used herein for purposes of illustration, but any suitable type of file could be used. When the server receives the .json file, it may then map that command to a specific script or series of commands that execute the command for a specific network device.

To provide just one concrete, nonlimiting example, an "add capacity" command may be defined for a VANC instance. The "add capacity" command's purpose is to provision additional resources to a particular task. In a first context, the task is an HTTP web server. In a second context, the capacity is a database server. In a third context, the capacity is a physical computing resource, such as a rack-mount server.

Below are example .json files for different instances of the "add capacity" network policy macro.

Example 1: Add Capacity to an HTTP Server Pool

In this case, the user says, "Add capacity to the web server." In one embodiment, this command starts a "conversation" with VANC. VANC may parse or tokenize the command to extract two key tokens: "add capacity" and "web server." VANC now knows that this is an "add capacity" command for a web server. But VANC manages several web server resource pools, and needs to know which one to add capacity to. So VANC asks, "Add capacity to which HTTP server pool?" This query serves two purposes. First, it verifies with the user that VANC has correctly interpreted the previous speech as an "add capacity" command for a web server pool, and it requests additional information—a parameter—necessary to make the command complete.

The user responds "Online purchase page." Finally, VANC asks, "How many instances to add to online purchase page web server pool?" The user responds "Three."

VANC now knows that it should use the webserver.addcapacity.json macro, with specific configuration parameters which may be pulled from a configuration template. This macro may be of the following form:
{
    "macrotype": "Add Capacity"
    "macrospecies": "Web Server"
    "resourceSpecifics":[
    "webserverpool": "Order Page"
    "resourcetype": "Virtual Machine"
    "vmTemplate": "/var/templates/http/order.vm"
    "instances": "3"
    "success": "Successfully started VM."
    "failure": "VM failed to start."
    ]
}

Thus, in response to the dialog with the network administrator, VANC client produces the foregoing .json file, which serves as a network policy macro. VAN client then transmits the .json file to VANC server, which uses the network policy macro to compile a list of commands. These may be in the form of a script or procedure that takes appropriate parameters. For example, an "orderpage" class may be configured for instantiating instances of the order page web server.

orderpage.addcapacity("/var/templates/http/order.vm", 3);

This may be combined with other commands, procedures, or macros to provide the desired command string. Ultimately, these may translate into a series of commands (which themselves may be included in a shell script, for example) that are executed on the cluster that is to "spin up" three additional instances of the order page web server VM.

Note that the foregoing example illustrates a voice command mapping to a .json file, which maps to an object, which maps to a shell script. But that precise structure is not mandatory. In other cases, the voice command may map directly to an object or a shell script, in which case the object or shell script plays the role of a network policy macro. The specific implementation may be driven by the needs of a particular embodiment.

Example 2: Add Capacity to the Database Server

In this case, the user says, "Add capacity to the database server," meaning that an existing database server instance should be instructed to allow more connections. In one embodiment, this command starts a "conversation" with VANC. VANC may parse or tokenize the command to extract two key tokens: "add capacity" and "database server." VANC now knows that this is an "add capacity" command for a database server. But VANC manages several database servers, and needs to know which one to add capacity to. So VANC asks, "Add capacity to which database server?" The user responds "docserver," indicating the enterprise document storage server. Finally, VANC asks, "How many connections to add to docserver database?" The user responds "20."

VANC now knows that it should use the database.addcapcity.json macro, with specific configuration parameters which may be pulled from a configuration template. This macro may be of the following form:
{
    "macrotype": "Add Capacity"
    "macrospecies": "Database Connections"
    "resourceSpecifics":[
    "dbserver": "docserver"
    "resourcetype": "Database Connection"
    "newConnections": "20"
    "success": "Successfully added 20 database connections."
    "failure": "Adding 20 database connections failed."
    ]
}

In response to the dialog with the network administrator, VANC client produces the foregoing .json file, which serves as a network policy macro. VANC client then transmits the .json file to VANC server, which uses the network policy macro to compile a list of commands. These may be in the form of a script or procedure that takes appropriate parameters. For example, a "docserver" instance of the "dbserver" class may be configured to add additional connections.

docserver.addconnections(20);

This in its turn may translate to a series of binary commands or a shell script, as appropriate.

Example 3: Add Capacity to a Physical Resource

In this example, the user says, "Add one server rack to the workload cluster," meaning that an additional server rack should be provisioned for a task. VANC may parse or tokenize the command to extract four key tokens: "add" (action), "workload cluster" (target), "one" (quantity), and "server rack" (resource). VANC now knows that this is an "add capacity" command for a server rack. But VANC manages numerous large data centers with server racks for numerous clients and tenants, and needs to know which client or tenant is to get the additional server rack. So VANC asks, "Add one server rack for which tenant?" The user responds "Enterprise Services, Inc.," indicating which tenant is to get the new rack. VANC may then examine available resources, and determine that there is a rack available in the San Francisco datacenter.

VANC now knows that it should use the physical.rack.addcapacity.json macro, with specific configuration parameters which may be pulled from a configuration template. This macro may be of the following form:
{
    "macrotype": "Add Capacity"
    "macrospecies": "Server Rack (Physical)"
    "resourceSpecifics":[
    "datacenter": "San Francisco"
    "client": "Enterprise Services, Inc."
    "clientid": "1467-134"
    "tenant": null
    "number": "1"
    "success": "One additional rack has been provisioned for Enterprise Services, Inc."
    "failure": "No racks available to provision for Enterprise Services, Inc."
    ]
}

In response to the dialog with the network administrator, VANC client produces the foregoing .json file, which serves as a network policy macro. VANC client then transmits the .json file to VANC server, which uses the network policy macro to compile a list of commands. In this case, the commands may be more involved than in the previous cases. The rackmount server may need to be freed so that it can be allocated, which may include for example running an optimizing algorithm that reallocates tenants that use less than the full rack to other shared racks so that the rack is now free to be allocated to Enterprise Services, Inc.

In other cases, the network policy macro may even result in some action in the physical world: For example, the VANC server may determine that it is impracticable to reallocate existing tenants, and that a new server rack will need to be ordered and added to the San Francisco data center. The server may thus place the order for the new rack, and forward relevant information to critical personnel, such as accounting and IT. If floor space for adding new physical racks is low in the San Francisco data center, VANC may also send an alert to the facility manager, indicating that in the San Francisco data center, demand is starting to approach capacity.

Several detailed example workflows are also illustrated below. These workflows should be understood to be non-limiting, illustrative examples only. Those with skill in the art will recognize that other workflows are compatible with the present disclosure.

Work Flow 1: Configure a Network Device.
  a. The network administrator speaks to the VANC client, requesting the operation with an appropriate voice command. For example, "Configure server wl-0400." In some cases, this may start a dialog, in which the VANC client collects additional information.
  b. The VANC client parses and tokenizes the voice command, compiles or looks up a network policy macro, and sends the network policy macro to the VANC provisioning server.
  c. The VANC provisioning server operates a rules engine to determine the tenant/configuration/device profile to use for this network policy macro.
  d. The VANC provisioning server generates or looks up the appropriate script or command string to effect the network policy macro.
  e. The VANC provisioning server establishes a connection to the network device or devices to be configures, and sends the configuration commands.
  f. The VANC provisioning server polls the network device for status of the commands.
  g. The VANC provisioning server determines success or failure (or other feedback) and reports to the VANC client.
  h. The VANC client announces the feedback to the network administrator.

Work Flow 2: Querying Network Device Uptime.
  a. The network administrator speaks to the VANC client, requesting uptime for a particular device (e.g., "Get uptime for router r7-242").
  b. The VANC client parses and tokenizes the voice command, compiles or looks up a network policy macro, and sends the network policy macro to the VANC provisioning server.
  c. The VANC provisioning server operates a rules engine to determine the tenant/configuration/device profile to query for this network policy macro.
  d. The VANC provisioning server generates or looks up the appropriate script or command string to effect the request.
  e. The VANC provisioning server establishes a connection to the network device and queries its uptime.
  f. The VANC provisioning server receives the response.
  g. The VANC provisioning server reports the response to the VANC client.
  h. The VANC client announces the uptime to the network administrator.

Workflow 3: Subscribe to Alerts from a Network Device.
  a. The network administrator speaks to the VANC client, requesting alerts from a network device. For example, "Subscribe to alerts from server wl-0400."
  b. The VANC client parses and tokenizes the voice command, compiles or looks up a network policy macro, and sends the network policy macro to the VANC provisioning server.
  c. The VANC provisioning server operates a rules engine to determine the tenant/configuration/device profile to use for this network policy macro.
  d. The VANC provisioning server generates or looks up the appropriate script or command string to effect the network policy macro. This may include both configuring the network device to provide alerts, and configuring an internal table to indicate where those alerts should be forwarded.
  e. The VANC provisioning server establishes a connection to the network device or devices to be configures, and sends the configuration commands.
  f. The VANC provisioning receives an alert from the network device. This may include, for example, syslog messages, simple network management protocol (SNMP) traps, or enterprise mobility management (EMM) traps, by way of nonlimiting example.
  g. The VANC provisioning server looks up the destination for the alert, and sends the alert to the VANC client.
  h. The VANC client announces the alert to the network administrator.

A system and method for providing voice-activated network control will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Figure 1B:
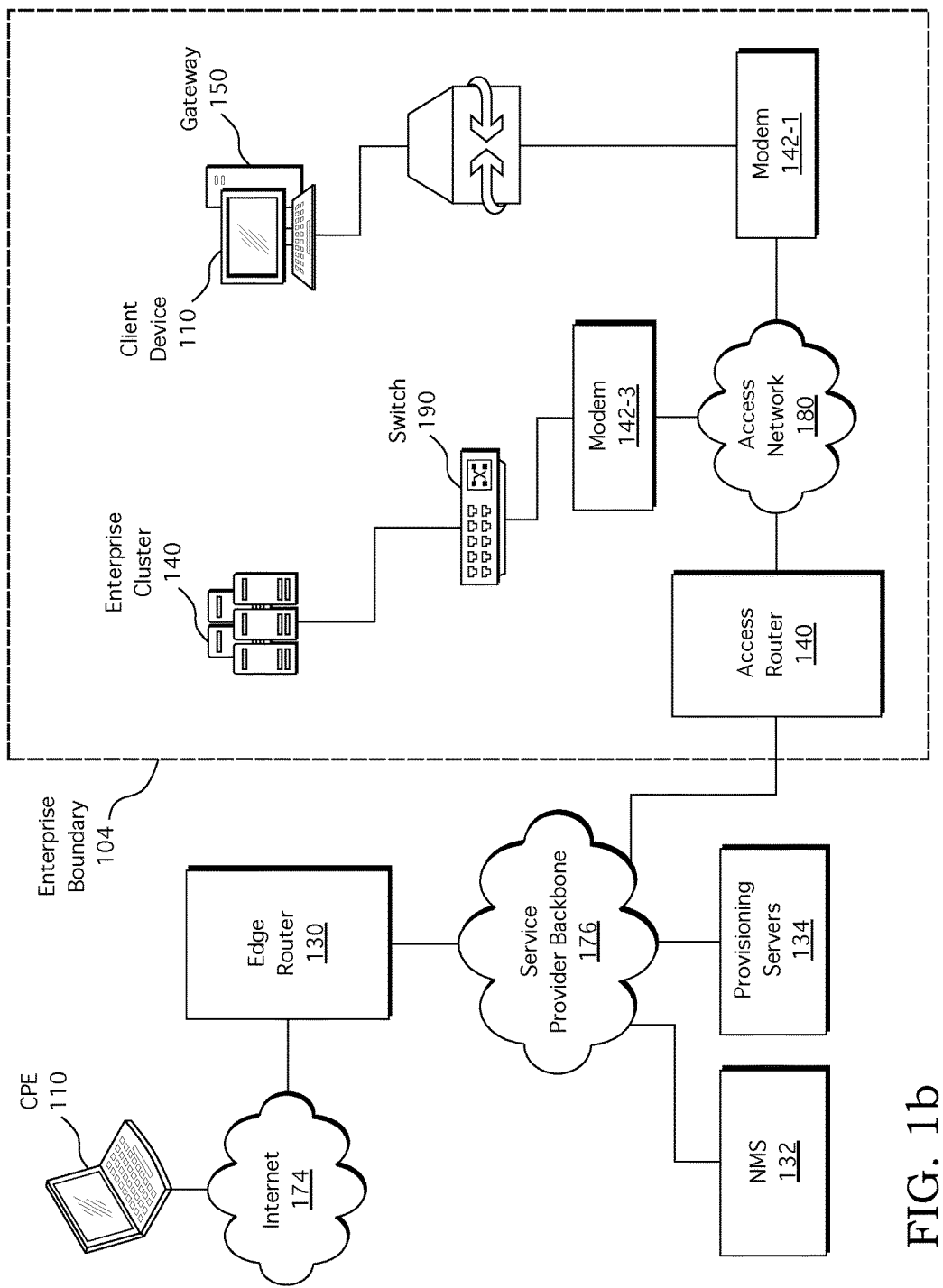

FIG. 1A is a network-level diagram of a networked enterprise 100 according to one or more examples of the present Specification. Note that FIGS. 1A and 1B provide an illustrative and nonlimiting example of a framework in which VANC may operate.

Enterprise 100 may be any suitable enterprise, including a business, agency, nonprofit organization, school, church, family, or personal network, by way of non-limiting example. In the example of FIG. 1A, a plurality of users 120 operate a plurality of endpoints or client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are for illustration only, and are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, along with appropriate software. In this illustration, enterprise network 170 is shown as a single network for simplicity, but in some embodiments, enterprise network 170 may include a more complex structure, such as one or more enterprise intranets connected to the Internet. Enterprise network 170 may also provide access to an external network 172, such as the Internet. External network 172 may similarly be any suitable type of network.

One or more client devices 110 may be provisioned with a VANC client (see, e.g., FIG. 2 below), which may be configured to permit network administrator 150 to perform network administration tasks via voice commands, and in particular, to manage devices and services within enterprise network 170. Within enterprise network 170, one or more devices may be configured with a VANC server (see, e.g., FIG. 3 below).

Networked enterprise 100 may communicate across enterprise boundary 104 with external network 172. Enterprise boundary 104 may represent a physical, logical, or other boundary. External network 172 may include, for example, websites, servers, network protocols, and other network-based services. In one example, network objects on external network 172 include a wireless base station 130, an application repository 182, an external endpoint 180, and an attacker 184. It may be a goal for enterprise 100 to provide access to desirable services, such as application repository 182 and external endpoint 180, while excluding malicious objects such as attacker 184.

Wireless base station 130 may provide mobile network services to one or more mobile devices 110, both within and without enterprise boundary 104.

Application repository 182 may represent a Windows or Apple "app store" or update service, a Unix-like repository or ports collection, or other network service providing users 120 the ability to interactively or automatically download and install applications, patches, or other software on client devices 110.

In some cases, networked enterprise 100 may provide policy directives that restrict the types of applications that can be installed from application repository 182. Thus, application repository 160 may include software that is not malware, but that is nevertheless against policy. For example, some enterprises restrict installation of entertainment software like media players and games. Thus, even a secure media player or game may be unsuitable for an enterprise computer. A security administrator 150 may be responsible for distributing a computing policy consistent with such restrictions and enforcing it on client devices 110.

FIG. 1B is a simplified block diagram of a network that may include, for example, enterprise network 170 and external network 172. FIG. 1B includes provisioning servers 134, a network management system (NMS) server 132, an Internet 174, an edge router 130, a service provider backbone 176, an access router 140, an access network 180, a plurality of modems 142-1, 142-2, 142-3, a gateway 150, and customer premises equipment (CPE) such as a client device 110.

Applications running on a customer premises equipment (CPE) 110 (an embodiment of a client device 110) can initiate two-way network communications in response to user interaction and autonomously generated events. Network management systems (e.g., provisioning servers 134, NMS server 132, etc.) can initiate two-way network communications to agent processes in the CPE. Two-way communications generally have unicast IP source and destination addresses. Often, network management systems repeatedly transmit certain types of information in structures called data carousels. Data carousels may be addressed to broadcast or multicast destinations. Data carousels usually convey information that is needed by the CPE, but that is unsuitable for storage in the CPE's persistent memory. For instance, if the CPE is a set-top box, system information and program guide information changes occasionally and this information would not be reliable when the set-top box activates after a significant time offline. Carousels deliver data with performance independent of the number of set-top boxes served. In addition, broadcast carousels can remain effective in some situations, where upstream communications are impaired.

Turning to the example infrastructure associated with present disclosure, CPE 110 can be associated with devices, customers, or end users wishing to receive data or content in energy management system 10 via some network. The term 'customer premise equipment' is inclusive of devices used to initiate a communication, such as a receiver, a computer, a set-top box, an Internet radio device (IRD), a cell phone, a smart phone, a tablet, a personal digital assistant (PDA), a Google Android, an iPhone, and iPad, or any other device, component, element, or object capable of initiating voice, audio, video, media, or data exchanges. CPE 110 may also be inclusive of a suitable interface to the human user, such as a display, a keyboard, a touchpad, a remote control, or other terminal equipment. CPE 110 may also be any device that seeks to initiate a communication on behalf of another entity or element, such as a program, a database, or any other component, device, element, or object capable of initiating an exchange. Data, as used herein in this document, refers to any type of numeric, voice, video, media, or script data, or any type of source or object code, or any other suitable information in any appropriate format that may be communicated from one point to another.

Service provider backbone 176 and Internet 174 each represent a series of points or nodes of interconnected communication paths for receiving and transmitting packets of information that propagate through networks. Service provider backbone 176 and internet 174 each offer a communicative interface between sources and/or hosts, and may be any appropriate network. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures, and DOCSIS cable television (CATV). The architecture of the present disclosure may include a configuration capable of transmission control protocol/internet protocol (TCP/IP) communications for the transmission and/or reception of packets in a network.

Access router 140 and modem 142 are network elements that can facilitate the networking activities discussed herein. As used herein in this Specification, the term 'network element' is meant to encompass any of the aforementioned elements, as well as switches, cable boxes of any kind (including set-top boxes), CMTSs, CMs, gateways, bridges, load balancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, access router 140 and/or modem 142 include software to achieve (or to foster) the networking activities discussed herein. Additionally, each of these elements can have an internal structure (e.g., a processor, a memory element, etc.) to facilitate some of the operations described herein. In other embodiments, these networking activities may be executed externally to these elements, or included in some other network element to achieve the intended functionality. Alternatively, access router 140 and/or modem 142 may include software (or reciprocating software) that can coordinate with other network elements in order to achieve the networking activities described herein. In still other embodiments, one or several devices may include any suitable algorithms, hardware, software, components, modules, interfaces, or objects that facilitate the operations thereof.

Switch 190 may be any network switch, including a switch with advanced intelligence and software. Cisco® N7000-series switches, for example, provide significant intelligence, along with support for technologies such as remoted integrated service engine (RISE), dynamic fabric automation (DFA), intelligent traffic director (ITD), and many others. In some cases, switch 190 may be configured with a VANC server (see FIG. 3 below), thus enabling network administrator 150 to perform network administration tasks.

Figure 2:
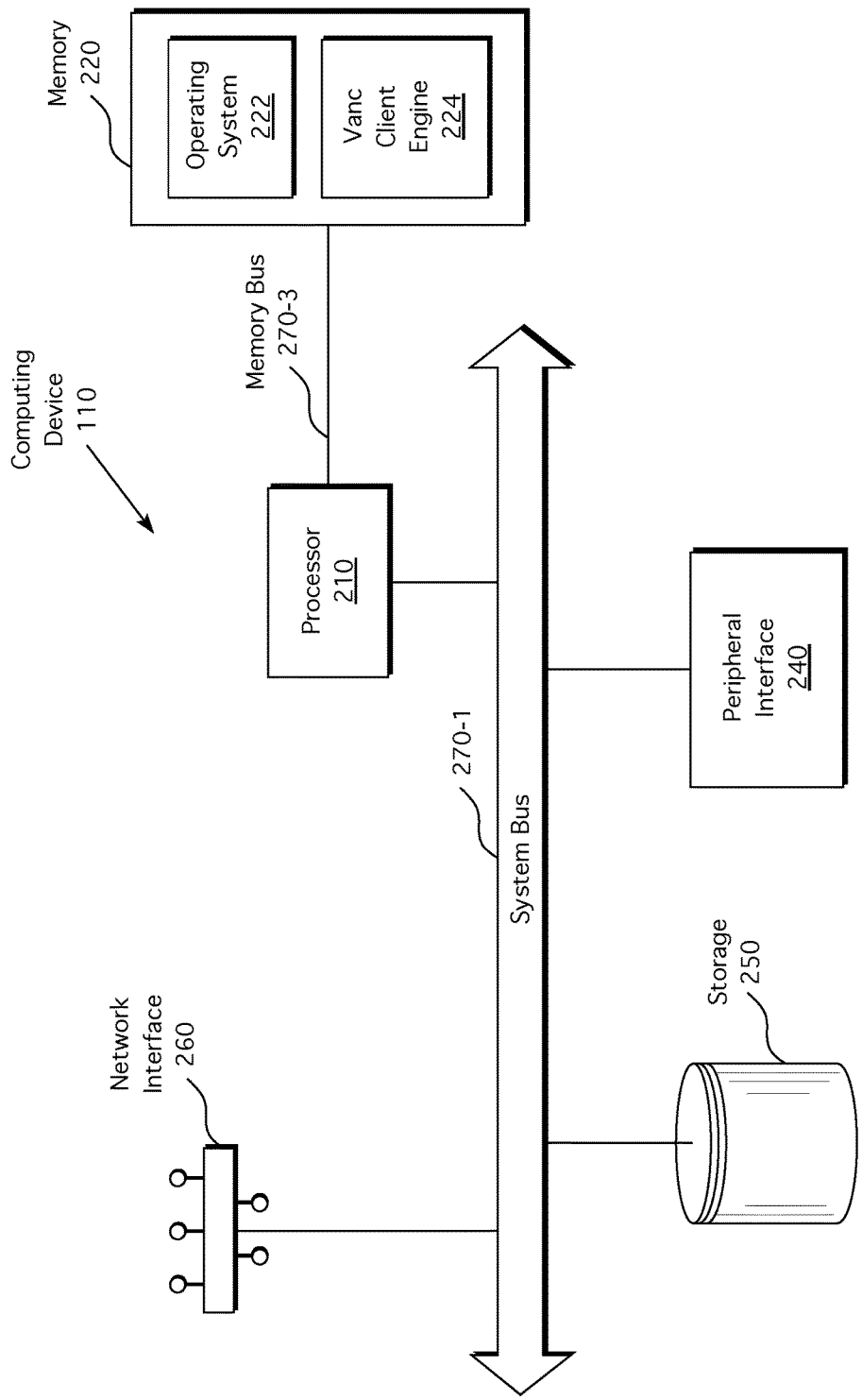
FIG. 2 is a block diagram of a client-class computing device, such as a customer-premises equipment (CPE) or endpoint device, according to one or more examples of the present specification.

FIG. 2 is a block diagram of client device 200 according to one or more examples of the present specification. Client device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host." In certain embodiments, client devices 110 (FIG. 1A) and CPE 110 (FIG. 1B) may all be examples of client devices 200. Client device 200 may be configured to provide a VANC client, as illustrated herein.

Client device 200 includes a processor 210 connected to a memory 220, having stored therein executable instructions for providing an operating system 222 and at least software portions of a VANC client engine 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of VANC client engine 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an Internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

VANC client engine 224, in one example, is operable to carry out computer-implemented methods as described in this specification. VANC client engine 224 may include one or more tangible non-transitory computer-readable mediums having stored thereon executable instructions operable to instruct a processor to provide a VANC client engine 224. As used throughout this specification, an "engine" includes any combination of one or more logic elements, of similar or dissimilar species, operable for and configured to perform one or more methods provided by the engine. Thus, VANC client engine 224 may comprise one or more logic elements configured to provide methods as disclosed in this specification. In some cases, VANC client engine 224 may include a special integrated circuit designed to carry out a method or a part thereof, and may also include software instructions operable to instruct a processor to perform the method. In some cases, VANC client engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that VANC client engine 224 may also include other hardware and software, including configuration files, registry entries, and interactive or user-mode software by way of non-limiting example.

In one example, VANC client engine 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of VANC client engine 224 to provide the desired method.

VANC client engine 224 may include a user interface for providing access to VANC functions, as well as other logic for providing VANC services. In a general sense, any of the functional blocks on FIGS. 4 and 5 may be provided by VANC client engine 224. VANC client engine 224 may also include other components, such as an authentication module. The authentication module may authenticate network administrator 150 to client device 110, and may provide authentication credentials to enterprise network 170.

VANC client engine 224 may also include a connectivity module or suite that interfaces with network interface 260, and provides connectivity to enterprise network 170, for example via wireless base station 130, external network 172, or within enterprise network 170. Thus, it should be recognized that VANC may be provided either within enterprise boundary 104, or without enterprise boundary 104. In some cases, for network administrator 150 to perform network administration tasks on enterprise network 170 within the VANC client, network administrator 150 may need to start a VNC session, or other IP tunneling service so that VANC client engine 224 appears to be operating within enterprise boundary 104. This is provided as a nonlimiting example only, however.

Additional details of the function of VANC client engine 224 are described with more particularity in FIGS. 4-7.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, microphone driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU).

Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example. In a particular case, audio driver 244 may include any suitable microphone and transducer for capturing sounds and converting those sounds to voice data to be processed by an STT engine, such as one provided within or in addition to VANC client engine 224.

I/O driver 246 may include many different kinds of inputs and outputs, including keyboard, touchscreen, mouse, and similar. In some cases, speakers may be used to provide audio output. This may be useful in VANC "conversations," in which the user and client exchange verbal messages, and for providing audible alerts. In appropriate embodiments, haptic feedback may also be provided, such as a "vibrate" function for notifying the user of available alerts.

Figure 3:
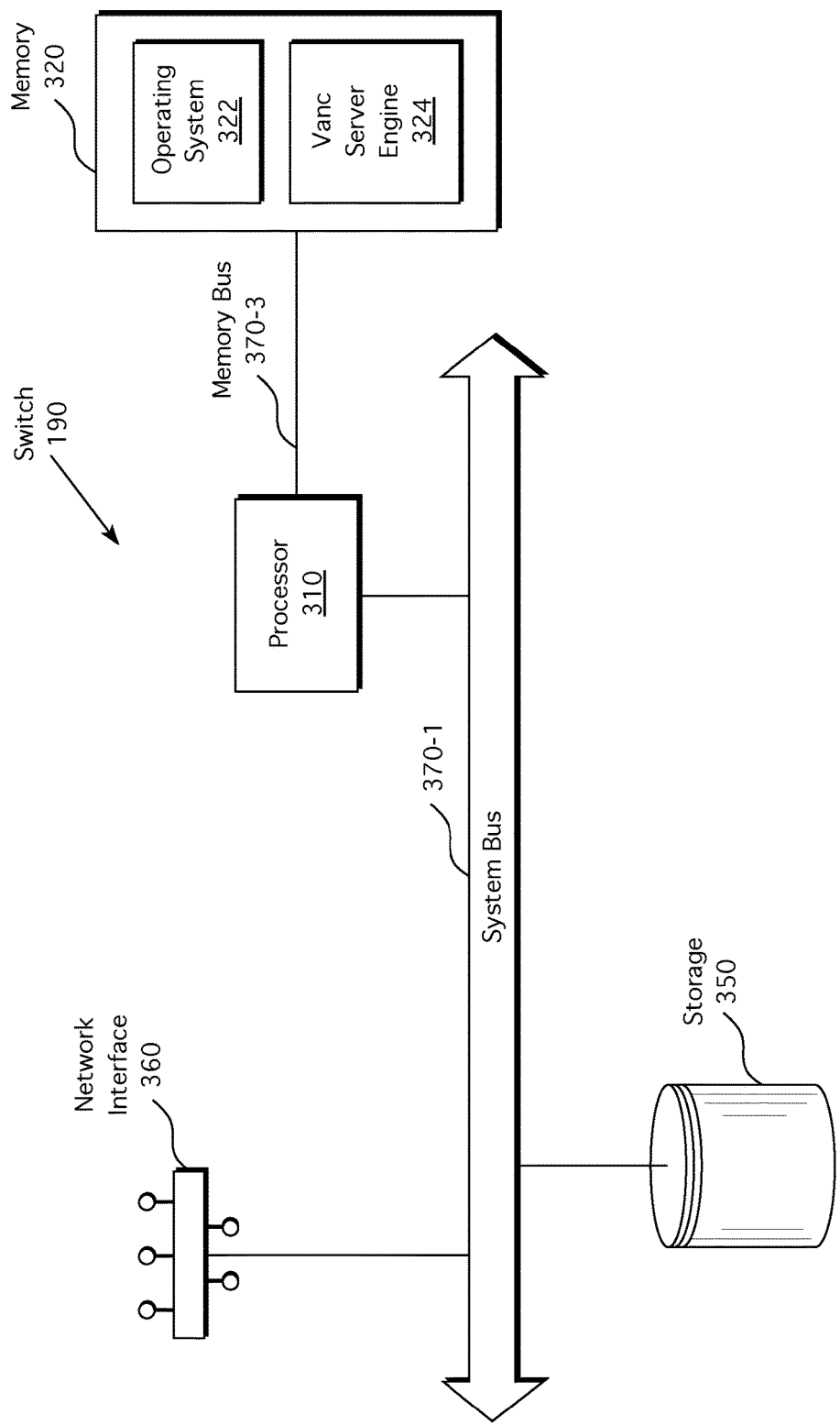
FIG. 3 is a block diagram of a network switch or other server-class computing device according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a VANC server engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of VANC server engine 324.

Network interface 360 may be provided to communicatively couple server 140 to a wired or wireless network, and may include one or more logic elements as described in FIG. 2.

VANC server engine 324 is an engine as described in FIG. 2 and, in one example, includes one or more logic elements operable to carry out computer-implemented methods as described in this specification. Software portions of VANC server engine 324 may run as a daemon process.

VANC server engine 324 may include one or more non-transitory computer-readable mediums having stored thereon executable instructions operable to instruct a processor to provide server engine functions. At an appropriate time, such as upon booting server 140 or upon a command from operating system 322 or a user 120 or security administrator 150, processor 310 may retrieve a copy of VANC server engine 324 (or software portions thereof) from storage 350 and load it into memory 320. Processor 310 may then iteratively execute the instructions of VANC server engine 324 to provide the desired method.

Figure 4:
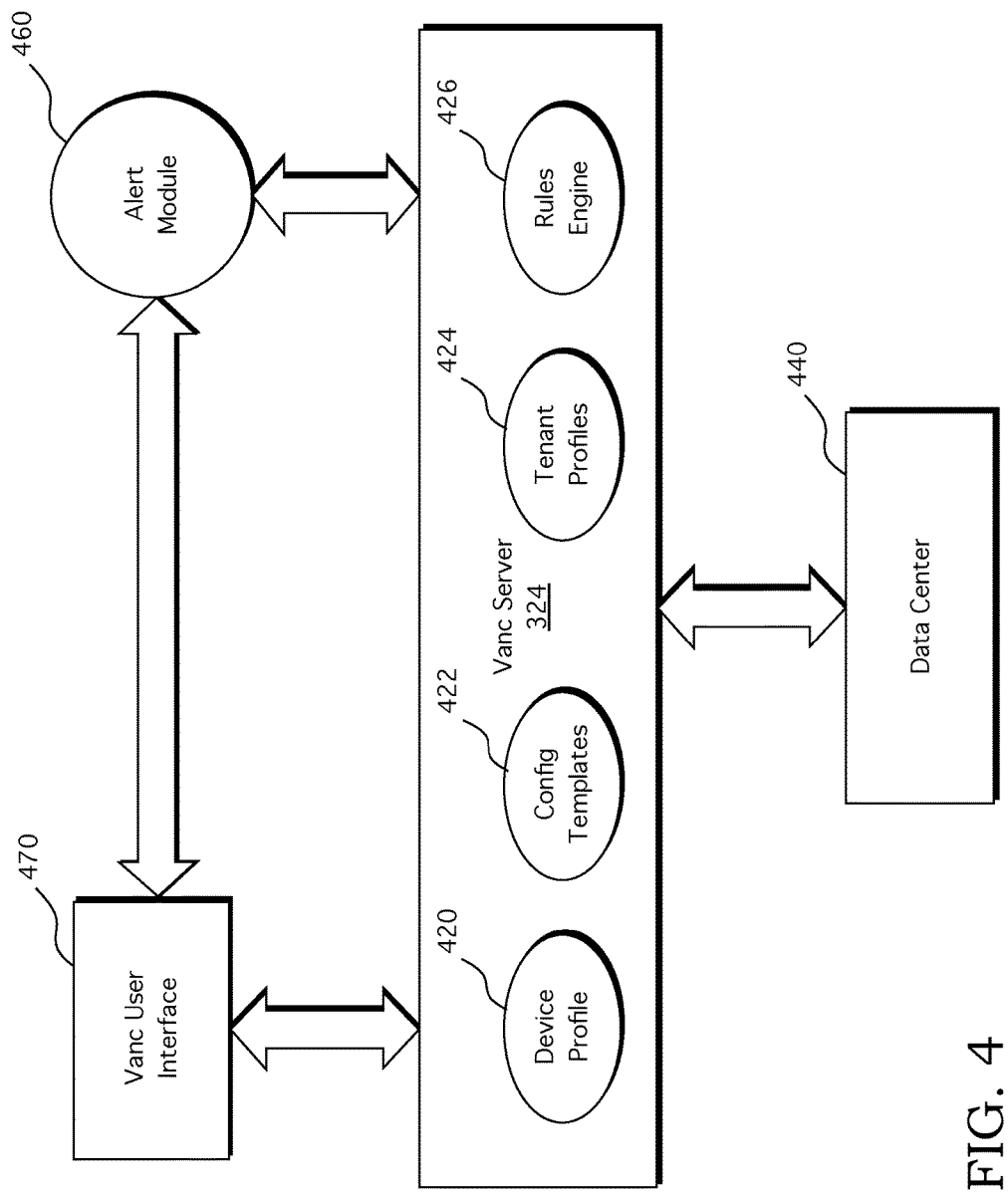
FIG. 4 is a block diagram of a voice-activated network control (VANC) architecture according to one or more examples of the present specification.

FIG. 4 is a block diagram of a VANC architecture according to one or more examples of the present specification. It should be noted that the elements disclosed on FIG. 4 are not intended to imply a single physical device or to require any particular physical architecture. Rather, the blocks disclosed in FIG. 4 provide a functional outline of a nonlimiting VANC embodiment. Thus, in a general case, the elements disclosed in FIG. 4 can be provided on one or any number of network devices.

According to various embodiments, a client device 110 may include locally an essentially complete VANC client engine. In that case, VANC processing may be provided almost exclusively on client device 110, up to the building of an appropriate network policy macro. Specifically, the user may speak appropriate commands into a microphone or other transducer of client device 110, client device 110 may perform all local processing and conditioning on the spoken commands, and may build a complete network policy macro to provide to a network device, such as switch 190. The network policy macro may be a higher-level command or script (as illustrated above), or may be as detailed as a complete shell script, with appropriate parameters, to be executed on the target network device.

In other embodiments, a more distributed architecture is provided. For example, a user speaks a command into a microphone of client device 110, and client device 110 digitizes the vocal input via its transducer. Client device 110 then offloads processing of the digitized voice data to a separate voice recognition server, such as a cloud-based STT service. The cloud-based STT service may then return to client device 110 an ASCII text string of the words spoken by the user. This ASCII text string may be processed either locally, or on a remote server, and converted into a network policy macro, with or without additional user input. Many other embodiments and configuration options are available, and are intended to be included within the broad scope of the present specification.

In this example, a VANC user interface 470 is provided as part of VANC client engine 224 of FIG. 2. VANC user interface 470 may include an app on a smartphone or tablet (downloadable, for example, via application repository 182), or a user-space application on a network-connected PC.

VANC user interface 470 provides any user interface or user-facing services that are necessary to allow a network administrator 150 to interface with VANC client engine 224. This can include both input and output. For example, VANC user interface 470 may provide both voice activated inputs, and may also be configured to receive textual, screen, or other types of electronic input signals. For outputs, haptic feedback, text to speech feedback, or screen-bases output may be provided by way of nonlimiting example.

VANC server 324 is disclosed as residing on network switch 190 by way of nonlimiting example. However, it should be understood that VANC server 324 may reside in whole or in part on any suitable network device, including client device 110, and may be completely local, completely off-site, or distributed.

In this example, VANC server 324 includes a device profile 420, configuration templates 422, tenant profiles 424, and a rules engine 426. VANC server 324 connects the data center 440, where command strings compiled by VANC server 324 are executed on network devices of enterprise network 170.

Within VANC server 324, device profile 420 may include a repository of device profiles (e.g., a profile for each device or type of present in the enterprise network), including information about client device 110. This may enable VANC user interface 470 to compile appropriate network policy macros, and VANC server 324 to compile appropriate command scripts for execution. Device profile 420 may also be used for authentication purposes. For example, device profile 420 may include a capability profile that indicates the authentication mechanisms available on client device 110. This may enable VANC client 224 and VANC server 324 to enforce authentication rules.

Configuration templates 422 may include a repository of templates that may be used for configuring the network for different customers with different topologies.

Tenant profiles 424 may be a repository of profiles representing different VM "tenants" on the network, and policies for configuring each. In a virtualization environment, a hypervisor or virtualization manager may provide a number of tenants, which are discrete computational units that are separated from one another. Each tenant may have operating therein one or more virtual machines. Thus, tenant profiles 424 may include information about each tenant, which can be used to configure the tenant appropriately.

Rules engine 426 includes rules to correlate user inputs to the tenant profile, configuration template, and device profile. Data may be collected, for example, from device profiles, to determine how to communicate with a network device (e.g., tcl, REST, Cisco® APIC, or NetConf).

The rules engine may be used to build network policy macros from spoken natural language (e.g., on the client side), and to build command scripts from network policy macros (e.g., on the server side). Thus, using a configuration template, a network administrator 150 may configure certain voice-activated commands that map to customized network policy macros. This may include automation of repetitive tasks. For example, the voice command "get status" may tell VANC to get the status of the network.

In some examples, commands may be provided with configurable parameters that can be used very naturally to perform network tasks. For example, network administrator 150 could say "get the status of the network." In this case, "get" is a keyword indicating that this is a request for information. "Status" indicates the species of information. "Network" is the target of the request.

VANC server 324 interfaces with data center 440, which includes for example enterprise cluster 140, or other network resources that are managed by VANC server 324. Thus, when a user operates VANC user interface 470, VANC server 324 receives or builds the appropriate command script, and provides the command script to a device or server within data center 440.

Alert module 416 may provide periodic alerts or information back to VANC user interface 470. For example, network administrator 150 may configure alert module 460 to provide a network status update every evening at 6:30 PM, or hourly, or on any desired periodic schedule. Alert module 460 may also manage certain triggers, such as when a server or node goes down, or other events happen. Those events may be configured within configuration templates 422 and rules engine 426. When a matching condition occurs or event alert is received, the alert is triggered within alert module 460. The alert is then provided back to VANC user interface 470. VANC user interface 470 may provide an appropriate notification to network administrator 150, such as spoken text or a screen display. In some cases, haptic feedback may also be used, such as to alert network administrator 150 even when his is phone on silent, or if he is hearing impaired.

Figure 5:
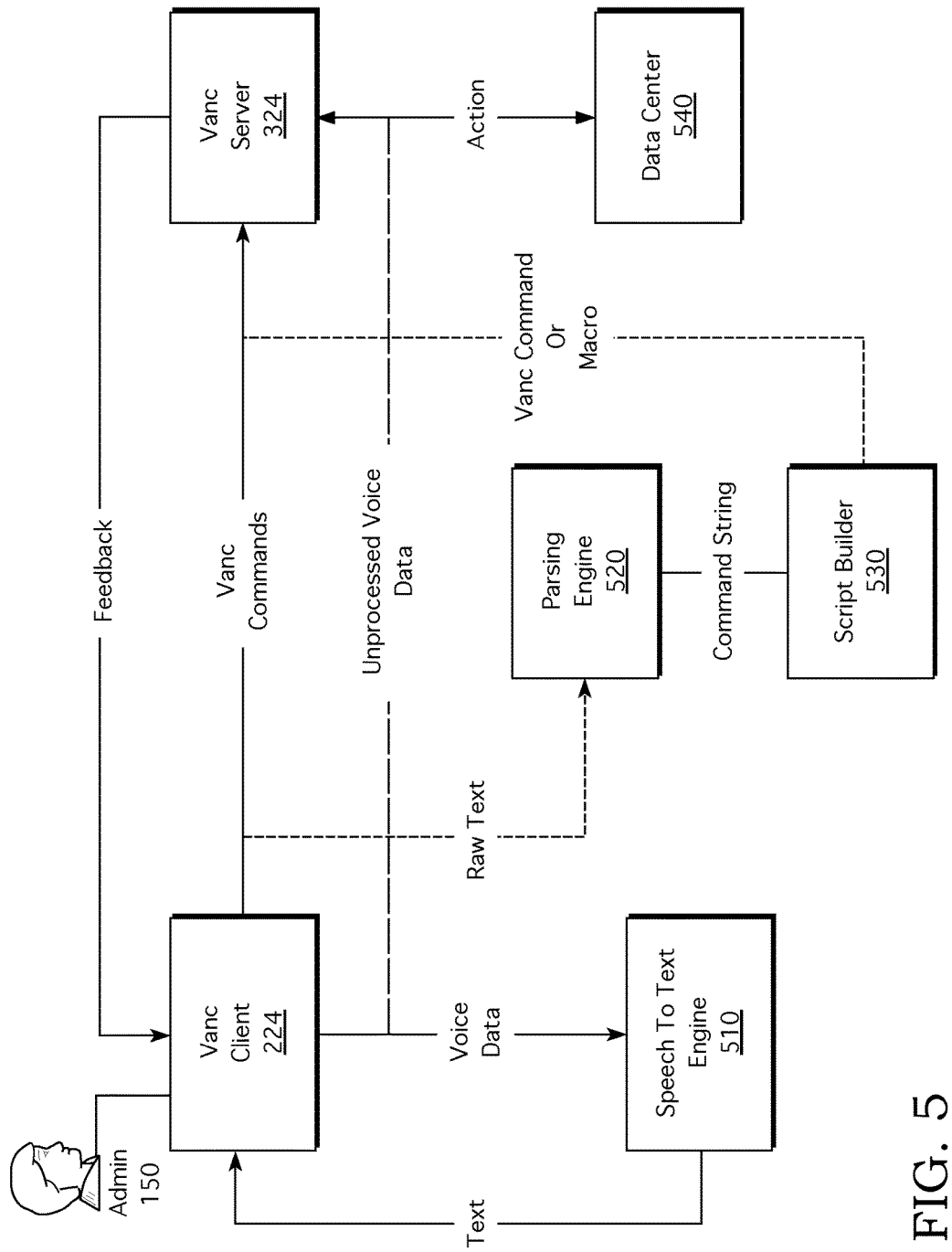
FIG. 5 is a block diagram illustrating signal flow in a VANC architecture according to one or more examples of the present specification.

FIG. 5 is a block diagram of signal flow according to one or more examples of the present specification. In this example, network administrator 150 operates VANC client 224. Note that the logical blocks disclosed in FIG. 5 can each reside on any appropriate computational device, such as a client device 110, a server, a network switch, a cloud-based server, a special-purpose computing appliance, or any other appropriate computing device. The logical divisions shown here are disclosed by way of nonlimiting example only, and it should be understood that any appropriate configuration may be used.

In certain embodiments, VANC client 224, STT engine 510, parsing engine 520, and script builder 530 may all reside on client device 110. In another example, VANC client 224 resides on client device 110, while STT engine 510 may be a cloud-based service. Parsing engine 520 and script builder 530 may in their turn reside either on client device 110 or on VANC server 324. Alternatively, one of parsing engine 520 and script builder 530 may reside on VANC client 224, while the other may reside on VANC server 324. Further alternatively, script builder 530 may include portions that reside both on VANC client 224 and VANC server 324 (e.g., VANC client 224 compiles a network policy macro, while VANC server 324 builds a command script). Many other combinations and divisions of functions are possible.

In this example, administrator 150 operates VANC client 224, such as by speaking into a microphone. VANC client 224 provides transduced voice data to STT engine 510, which may reside locally, on a server, or in the cloud. STT engine 510 converts those data into an appropriate format, such as ASCII text. ASCII text is used herein by way of nonlimiting example, but it should be understood that STT engine 510 may convert the data into any appropriate machine-readable format for use by a computing device.

STT engine 510 provides the text back to VANC client 224. VANC client 224 provides the raw ASCII text to parsing engine 520. Parsing engine 520 may use an appropriate algorithm, including a feedback-capable machine learning algorithm, to parse the raw text into appropriate component parts. This may include, for example, parsing the raw text into a major command, a minor command, and parameters. This may also include eliminating articles and prepositions so that only meaningful text is left.

By way of example, network administrator 150 may speak a command into a microphone of client device 110, such as "Get the status of the network." Parsing engine 520 may include a natural language engine, which may disregard articles and prepositions, reducing the command to "get status entire network." Parsing engine 520 may then parse the term "get" to indicates that network administrator 150 is requesting an output. The keywords "status" may indicate that the requested output is a status update. The key phrase/token "entire network" may indicate the parameter that the status of the entire network is to be returned.

On the other hand, if administrator 150 says "get the status of 10.10.4.20," the natural language engine may again parse out articles and prepositions, identify keywords and phrases, and ultimately return the status of the network device with the IP address 10.10.4.20. If network administrator 150 were to say "get the status of N7k-432," the status of a network switch named N7k-432 may be returned.

A VANC distribution may be provided by default with certain commands that map to pre-defined network policy macros, including useful parameters. However, network administrator 150 need not be limited to preconfigured commands and macros. Configuration templates 422 may provide a mechanism for network administrator 150 to provide customized commands and parameters.

Script builder 530 compiles an appropriate network policy macro from the output of parsing engine 520. Note that script builder 530 may be a two-stage engine in certain embodiments, and functions may be divided between a network policy macro engine and a command script engine. These two engines are shown here together to illustrate that they may be combined on a single device, but they may also be provided separately. For example, the network policy engine of script builder 530 may be provided on client device 110, while the command script engine may be provided on a network device, such as switch 190.

It should also be noted that in some examples, a user feedback loop may be included. For example, administrator 150 may speak to VANC client 224, which provides voice data to STT engine 510, and receives ASCII text back. VANC client 224 then provides the raw ASCII text to parsing engine 520, which provides a command string to script builder 530. Script builder 530 may determine that additional data are needed to complete the network policy macro. Thus, script builder 530 may notify VANC client 224 that additional data should be requested. VANC client 224 may then display or speak back to administrator 150 a request for the appropriate information. For example, administrator 150 may say "server status" to VANC client 224. Script builder 530 may determine that this is a macro that requires a parameter, namely the identity of the server whose status is being queried. Thus, script builder 530 informs VANC client 224 that the name of a server is required. VANC client 224 may then display text on a screen, and may also use a text-to-speech engine to say back to administrator 150, "which server?" Administrator 150 may then provide the name of the server whose status he is requesting. VANC client 224 may provide this to STT engine 510, which converts the spoken word to ASCII text. VANC client 224 then provides the ASCII text to parsing engine 520, which provides the properly conditioned and parsed parameter to script builder 530. Note that is in this example, parsing engine 520 may still eliminate extraneous words such as articles and prepositions. Thus, if administrator 150 says "of server N7k-432," parsing engine 520 may eliminate all text except for the name of the server, namely "N7k-432."

Once the network policy macro is compiled, it is provided to script builder (either internally, or via an external interface), which builds the command script. VANC server 324 then provides the command script for execution on one or more machines in data center 540. The machine(s) in data center 540 may then report back the status of the command, such as success or failure, and VANC server 324 may provide feedback to VANC client 224, indicating the result of the command.

Figure 6:
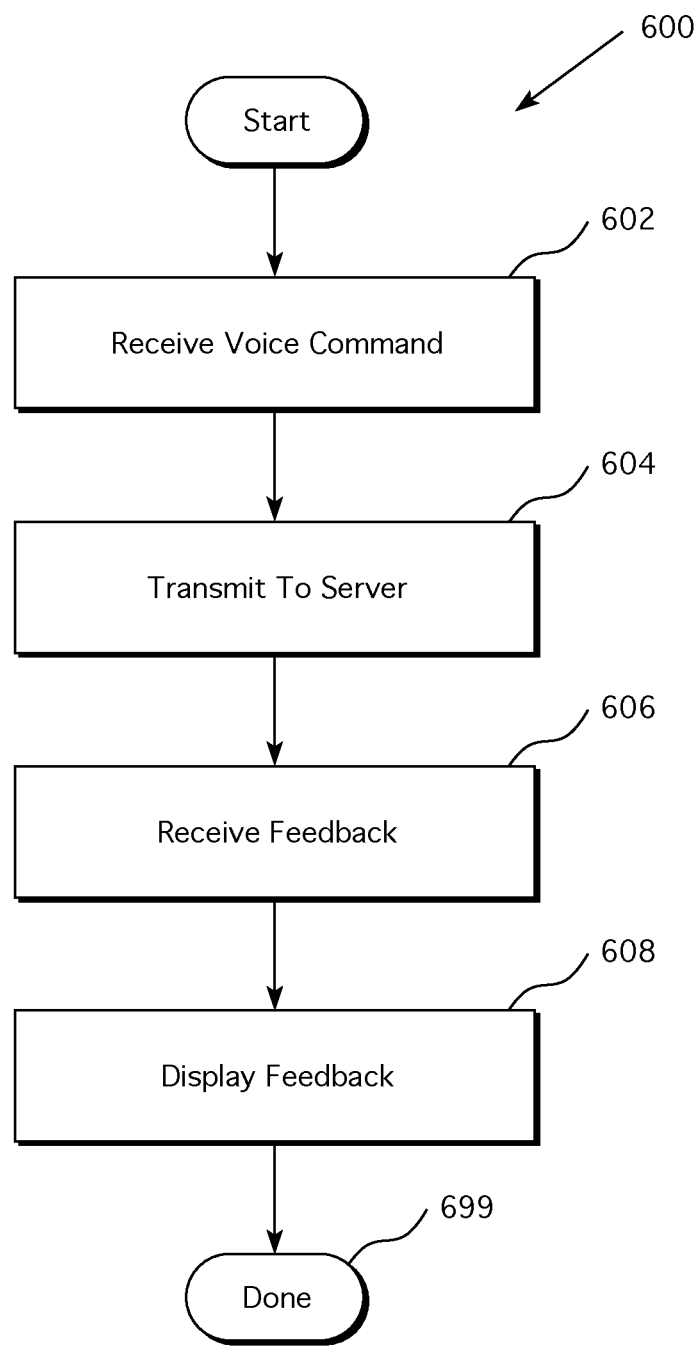
FIG. 6 is a flowchart of a method performed by a user device according to one or more examples of the present specification.

FIG. 6 is a flowchart of a method 600 performed by a VANC client 224 according to one or more examples of the present specification. In the example of FIG. 6, VANC client 224 is a "bare bones" VANC client, with minimal internal logic, providing only essential interface elements. This embodiment may be appropriate for VANC instances in which mobile device 110 has very limited processing capabilities.

In block 602, VANC client 224 receives from network administrator 150 a spoken command.

In block 604, VANC client 224 transmits the command to VANC server 324. In some examples, this may include transmitting the unprocessed voice data to VANC server 324, so that VANC server 324 can perform STT processing on the voice data. In other embodiments, a separate cloud-based STT engine may be used. In that case, VANC client 224 provides a local interface to the cloud-based STT engine, and provides sound data to the STT engine, while the STT engine provides raw ASCII text back to VANC client 224. VANC client 224 may then provide the unprocessed ASCII text to VANC server 324.

In block 606, most substantial processing happens on VANC server 324. VANC server 324 provides feedback to VANC client 224. Note that in some examples, iterative feedback may be provided, such as the example where additional parameters to a command are requested. In that case, multiple messages may pass back and forth between VANC client 224 and VANC server 324.

In block 608, VANC client 224 displays or otherwise provides the feedback to network administrator 150.

In block 699, the method is done.

Figure 7:
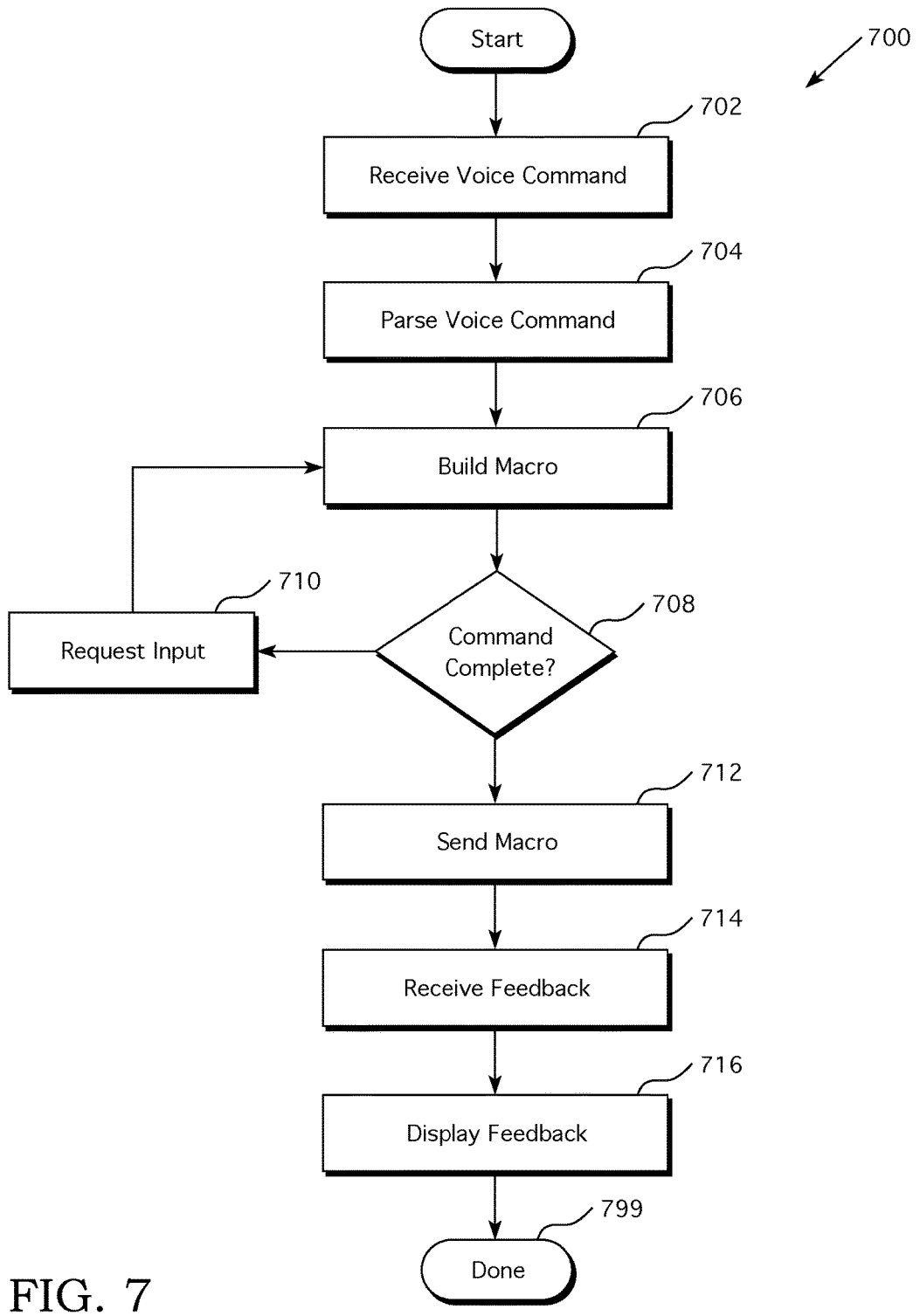
FIG. 7 is a flow chart of a method performed by a user device according to one or more examples of the present specification.

FIG. 7 is a flowchart of a method 700 performed by a more functionally-provisioned VANC client 224 according to one or more examples of the present specification. In this embodiment, more functionality is provided on VANC client 2244 than in method 600 of FIG. 6. Note that in embodiments where substantial processing is offloaded to VANC server 324, all or some of the operations of method 700 may be performed by VANC server 324.

In this example, in block 702, VANC client 224 receives voice text to from a network administrator 150. VANC client 224 converts the voice command to ASCII text, such as through a local STT engine, or through a cloud-based STT engine.

In block 706, VANC client 224 builds a network policy macro. This may include the use of a local parsing engine 520, and a local script builder 530, though in this embodiment script builder 530 may include only the network policy macro engine of script builder 530. In other embodiments, a command scripting engine may also be provided.

In decision block 708, VANC client 224 determines whether the command is complete, or whether it requires additional parameters.

If the command is not complete, then in block 710, VANC client 224 begins a VANC dialog to request additional input from network administrator 150. Control returns to block 706 to continue collecting information necessary to build the network policy macro.

Returning to block 708, if the command is complete, then in block 712, VANC client 224 sends the network policy macro to VANC server 324.

In block 714, VANC client 224 receives from VANC server 324 any feedback resulting from the command.

In block 716, VANC client 224 displays the feedback to network administrator 150 through any of the methods disclosed herein, such as screen display, text-to-speech, haptic feedback, or any other appropriate feedback mechanism.

In block 799, the method is done.

Figure 8:
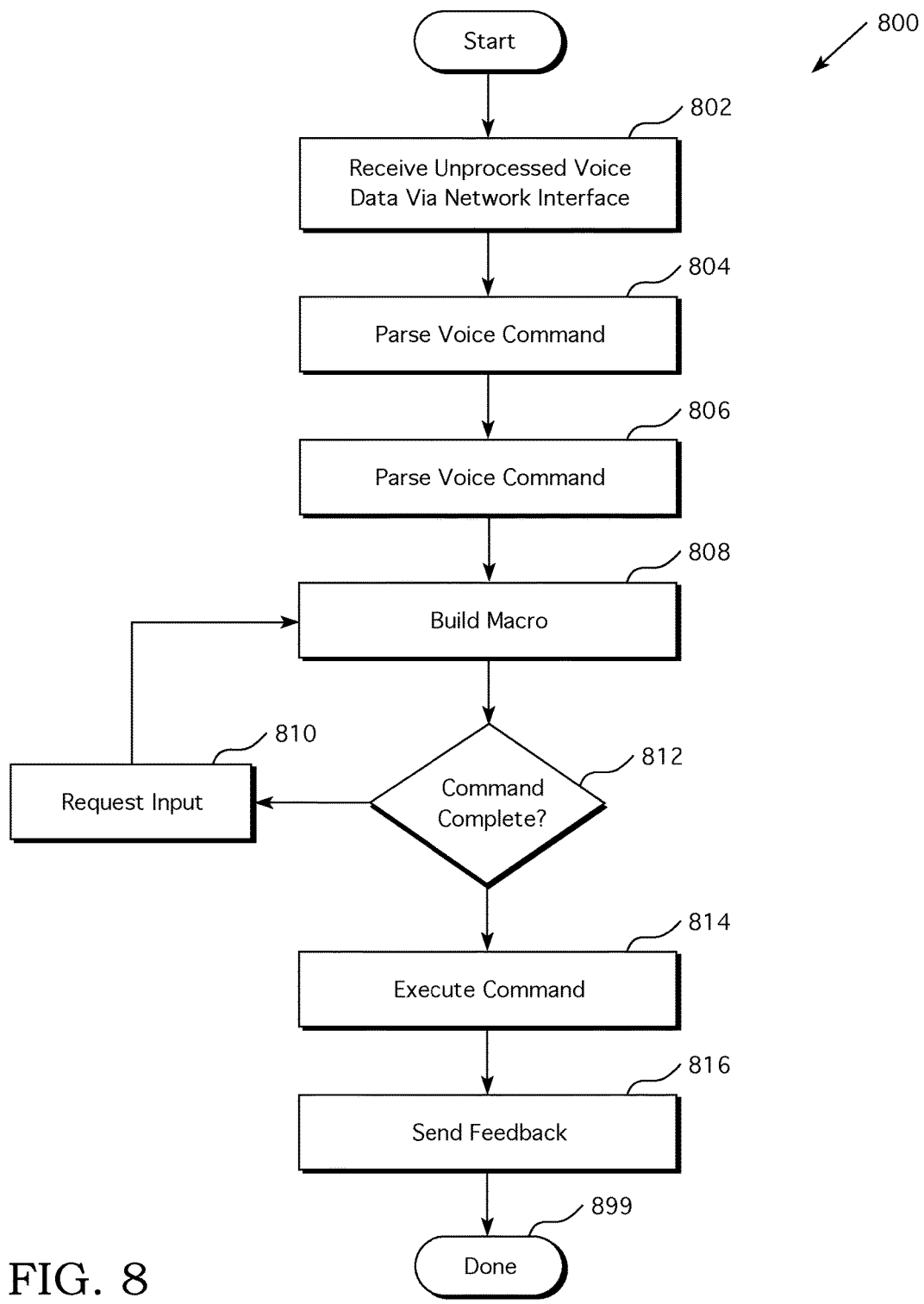
FIG. 8 is a flow chart of a method performed by a server according to one or more examples of the present specification.

FIG. 8 is a flowchart of a method 800 performed by a VANC server 324 according to one or more examples of the present specification. This embodiment may include one where a "bare-bones" VANC client 224 is provided on client device 110. In cases where a more fully-functional VANC client 224 is provided, certain of the operations disclosed in this method may be performed on VANC client 224. The specific division of labor in all of the methods of FIGS. 6, 7, and 8 may be determined according to the engineering and design constraints of a particular embodiment, and are within the abilities of one skilled in the art. Thus, these methods should be understood to be nonlimiting examples, and the omission of a particular division of labor in the foregoing should not be construed to imply that the specific embodiment is not encompassed by this disclosure.

In this example, in block 802, VANC server 324 receives the unprocessed text data from VANC client 224 via network interface 360. Depending on the embodiment, this may be raw voice data, or it may be ASCII text that was previously processed by an on-board or cloud-based STT engine of VANC client 224. Within this block, as necessary, VANC server 324 may perform STT on the voice data.

In block 804, VANC server 324 parses the voice command, as illustrated in connection with parsing engine 520 of FIG. 5 above.

In block 808, VANC server 324 begins building a network policy macro as illustrated in this specification.

In decision block 812, if the network policy macro cannot be completed with the information provided, then additional user input will be requested. In this case, the input already received may be treated as an interlocutory input that initiates the network policy macro building process, and provides a starting point for the network policy macro. Thus, in block 810, VANC server 324 initiates a VANC dialog. Specifically, VANC server 324 requests, via network interface 360, additional data from network administrator 150. Control then passes back to block 808 so that VANC server 324 can continue building the network policy macro until it is complete. Note that in embodiments where a separate command script is built from the network policy macro, the operations of these blocks may also include building a network policy macro. The decision of when to use a separate network policy macro and command script may be driven by design decisions. For example, in some cases, a first server may build the network policy macro, and another may build the command script. In that case, they may be separate. In a case where a single server performs the function, it may be advantageous to build the command script directly rather than providing an intervening network policy macro. These are, however, nonlimiting examples provided by way of illustration only.

In block 814, once the command is complete, VANC server 324 causes the command to be executed on the network device. This may include sending a series of commands over the network separately, or providing a single command script to be run on the network device. Again, the particular embodiment chosen may be driven by design considerations of the specific VANC instance.

In block 816, VANC server 324 may receive back from the target device any feedback that is provided for the command. VANC server 324 may then provide the feedback (if any) to VANC client 224.

In block 899, the method is done.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example, a computing apparatus, comprising: a network interface; and one or more logic element, including at least one hardware logic element, comprising a voice-activated network control (VANC) engine to: receive an input text string derived from a voice command; parse the input text string; and build a network policy macro from the parsed input string.

There is further disclosed an example, wherein the VANC engine is further to determine that additional input is needed, and to request the additional input from a user.

There is further disclosed an example, wherein the VANC engine is further to request the additional input via a text-to-speech engine.

There is further disclosed an example, wherein the VANC engine is further to determine locally that the additional input is necessary.

There is further disclosed an example, wherein the VANC engine is further to send the network policy macro to a server device via the network interface.

There is further disclosed an example, wherein the VANC engine is further to: send the network policy macro to a server via the network interface; receive a response from the server via the network interface; and generate a natural language or haptic feedback for a user.

There is further disclosed an example, wherein the response comprises success or fail information.

There is further disclosed an example, wherein the response comprises user-requested information encoded within the input string.

There is further disclosed an example, wherein the response comprises a periodic or incremental notification.

There is further disclosed an example, wherein the VANC engine is further to provide the natural language feedback to a text-to-speech engine.

There is further disclosed an example, wherein the VANC engine is further to periodically, or at a specified time, poll a server for status updates, and to generate a natural language status report.

There is further disclosed an example, wherein the computing apparatus is a client device.

There is further disclosed in an example, a computing apparatus comprising: a network interface; and one or more logic elements, including at least one hardware logic element, comprising a voice activated network control (VANC) server engine to: receive a network policy macro derived from a voice command; and based at least in part on the network policy macro, build command script for execution on a target device.

There is further disclosed an example, wherein the VANC server engine is further to cause the command script to be executed on the target device.

There is further disclosed an example, wherein the VANC server engine is further to receive a feedback from the target device.

There is further disclosed an example, wherein the VANC server engine is further to provide the feedback to a VANC client via the network interface.

There is further disclosed an example, wherein the script building engine is further operable to receive an interlocutory input via the network interface, and to initiate building the command script based at least in part on the interlocutory input.

There is further disclosed in an example, a method of providing voice-activated network control (VANC), comprising: receiving a voice input; converting the voice input to a computer-usable form; parsing the voice input into key tokens; building a network policy macro from the key tokens; and causing commands based on the network policy macro to be executed on a target device.

There is further disclosed an example, further comprising building a command script from the network policy macro.

There is further disclosed an example, further comprising providing feedback for the commands to a user.

There is further disclosed an example of one or more tangible, non-transitory computer-readable storage mediums having stored thereon executable instructions for instructing one or more processors for providing a VANC engine operable for performing any or all of the operations of the preceding examples.

There is further disclosed an example of a method of providing a VANC engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A computing apparatus, comprising:
   a network interface; and
   one or more logic elements, including at least one hardware logic element, comprising a voice-activated network control (VANC) engine configured to:
   receive an input text string derived from a voice command to add capacity to a physical resource;
   parse the input text string to extract an action including adding the capacity, a target including the physical resource, a capacity resource including the capacity to be added to the physical resource, and a quantity including a number of the capacity resource including the capacity to be added;
   build a network policy macro to add the capacity to the physical resource from the parsed input text string according to the action, the target, the capacity resource, and the quantity; and
   cause commands based on the network policy macro to be executed on a target device to cause the capacity to be added to the physical resource according to the action, the target, the capacity resource, and the quantity.

2. The computing apparatus of claim 1, wherein the VANC engine is further configured to determine that additional input is needed, and to request the additional input from a user.

3. The computing apparatus of claim 2, wherein the VANC engine is further configured to request the additional input via a text-to-speech engine.

4. The computing apparatus of claim 3, wherein the VANC engine is further configured to determine locally that the additional input is necessary.

5. The computing apparatus of claim 1, wherein the VANC engine is further configured to send the network policy macro to a server device via the network interface.

6. The computing apparatus of claim 1, wherein the VANC engine is further configured to:
   send the network policy macro to a server via the network interface;
   receive a response from the server via the network interface; and
   generate a natural language or haptic feedback for a user.

7. The computing apparatus of claim 6, wherein the response comprises success or fail information.

8. The computing apparatus of claim 6, wherein the response comprises user-requested information encoded within the input text string.

9. The computing apparatus of claim 8, wherein the response comprises a periodic or incremental notification.

10. The computing apparatus of claim 8, wherein the VANC engine is further configured to provide the natural language feedback to a text-to-speech engine.

11. The computing apparatus of claim 1, wherein the VANC engine is further configured to periodically, or at a specified time, poll a server for status updates, and to generate a natural language status report.

12. The computing apparatus of claim 1, wherein the computing apparatus is a client device.

13. A computing apparatus comprising:
a network interface; and
one or more logic elements, including at least one hardware logic element, comprising a voice activated network control (VANC) server engine configured to:
receive a network policy macro derived from a voice command to add capacity to a physical resource, wherein the network policy macro is built from an input text string derived from the voice command, wherein the input text string is parsed to extract an action including adding the capacity, a target including the physical resource, a capacity resource including the capacity to be added to the physical resource, and a quantity including a number of the capacity resource including the capacity to be added;
based at least in part on the network policy macro, build a command script; and
cause the command script to be executed on a target device to cause the capacity to be added to the physical resource according to the action, the target, the capacity resource, and the quantity.

14. The computing apparatus of claim 13, wherein the VANC server engine is further configured to receive a feedback from the target device.

15. The computing apparatus of claim 14, wherein the VANC server engine is further configured to provide the feedback to a VANC client via the network interface.

16. The computing apparatus of claim 13, wherein the VANC server engine is further configured to receive an interlocutory input via the network interface, and to initiate building the command script based at least in part on the interlocutory input.

17. A method of providing voice-activated network control (VANC), comprising:
receiving a voice input to add capacity to a physical resource;
converting the voice input to a computer-usable form;
parsing the voice input into key tokens including an action that includes adding the capacity, a target including the physical resource, a capacity resource including the capacity to be added to the physical resource, and a quantity including a number of the capacity resource including the capacity to be added;
building a network policy macro to add the capacity to the physical resource from the key tokens; and
causing commands based on the network policy macro to be executed on a target device to cause the capacity to be added to the physical resource according to the action, the target, the capacity resource, and the quantity.

18. The method of claim 17, further comprising building a command script from the network policy macro.

19. The method of claim 17, further comprising providing feedback for the commands to a user.

20. The method of claim 17, further comprising periodically, or at a specified time, polling a server for status updates, and generating a natural language status report.

* * * * *